C. BERGSTROM.
ATTACHMENT FOR CULTIVATORS.
APPLICATION FILED OCT. 19, 1914.
1,143,591.
Patented June 15, 1915.
2 SHEETS—SHEET 1.
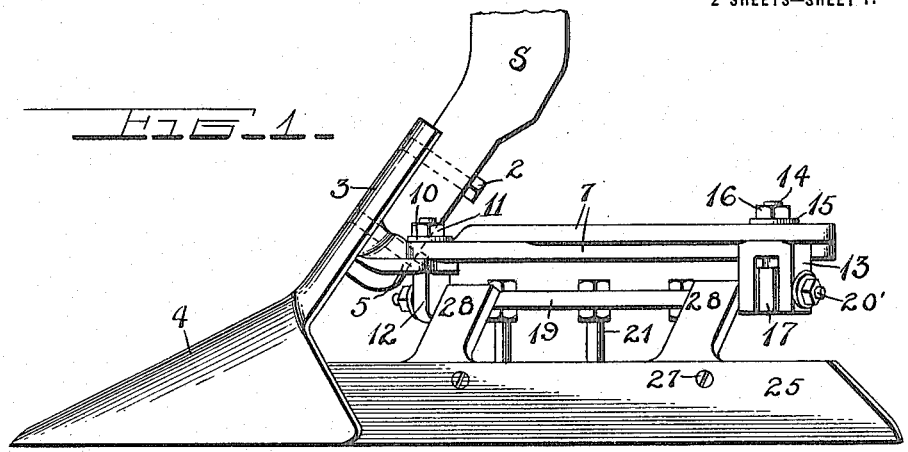
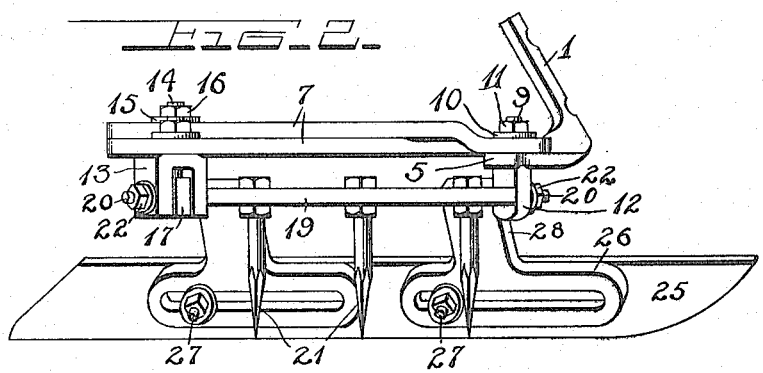
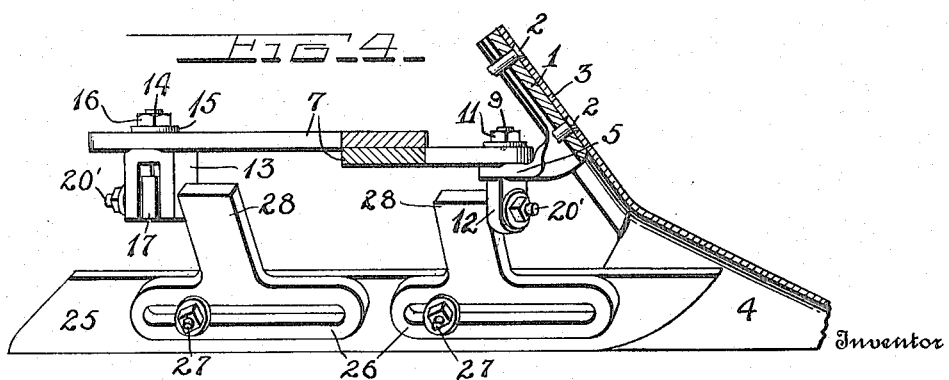
Witnesses
Edwin B. Hunt
Inventor
Carl Bergstrom
By H. B. Willson & Co.
Attorneys

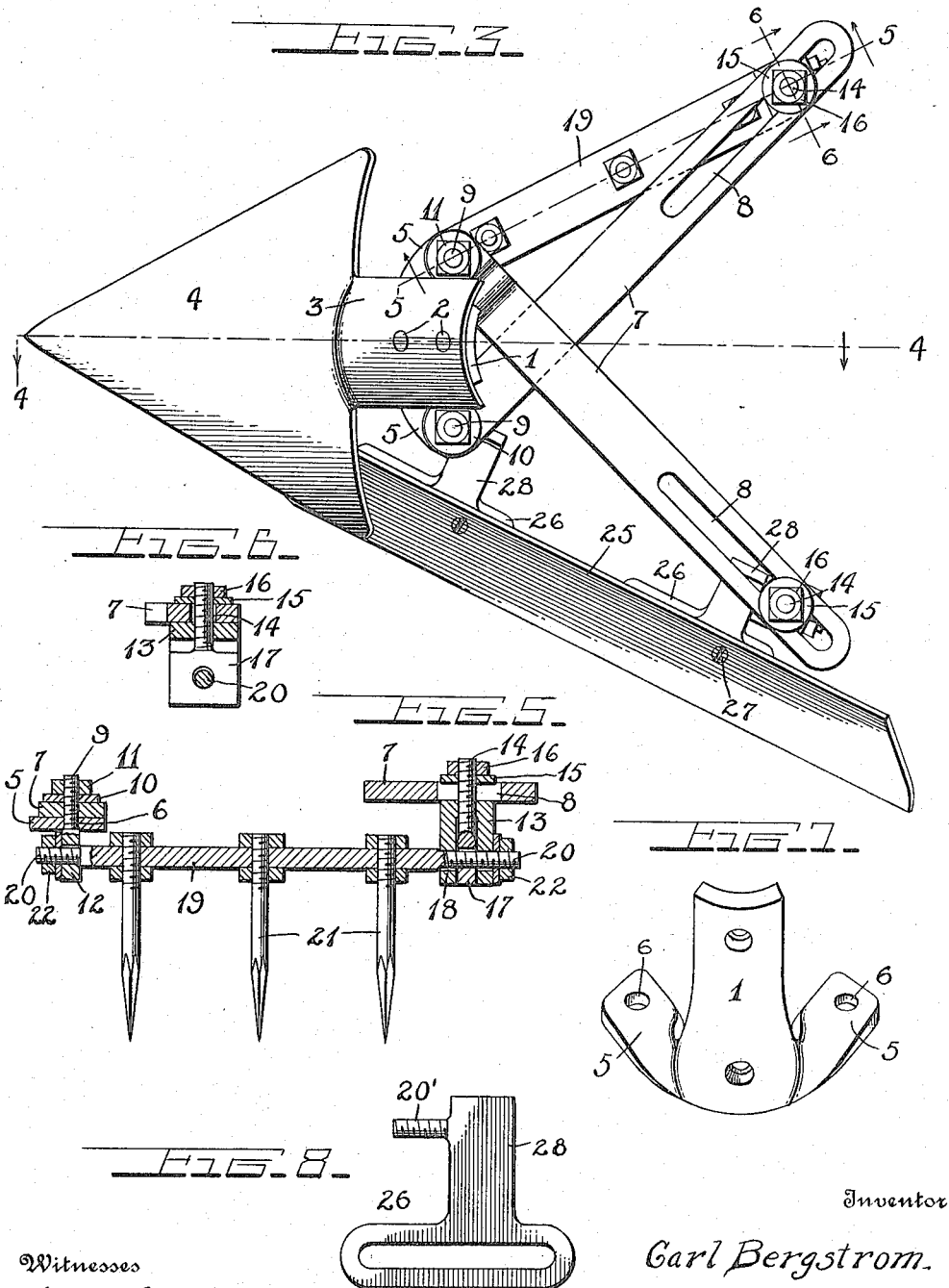

UNITED STATES PATENT OFFICE.

CARL BERGSTROM, OF LAWTON, OKLAHOMA.

ATTACHMENT FOR CULTIVATORS.

1,143,591.  Specification of Letters Patent.  Patented June 15, 1915.

Application filed October 19, 1914. Serial No. 867,372.

*To all whom it may concern:*

Be it known that I, CARL BERGSTROM, a citizen of the United States, residing at Lawton, in the county of Comanche and State of Oklahoma, have invented certain new and useful Improvements in Attachments for Cultivators; and I do declare the following to be a full, clear, and exact description of the invention, such as will enable others skilled in the art to which it appertains to make and use the same.

My invention relates broadly to improvements in agricultural implements, and more particularly to attachments for cultivators and the like.

The main object of the invention is to provide a simply constructed attachment which may be readily applied to or removed from a cultivator, and to equip said attachment with a plurality of interchangeable earth working implements.

In carrying out the above end, a further object of the invention becomes to so construct a device as to allow the width thereof to be varied, and to likewise provide other attachments to be more clearly set forth.

With the above and minor objects in view, the invention resides in certain novel features of construction, and combination, herein described and claimed, and shown in the drawings wherein:

Figure 1 is a side elevation showing a device constructed in accordance with my invention attached to the lower end of a cultivator standard; Fig. 2 is a side elevation of the opposite side of the device, one of the implements being removed; Fig. 3 is a top plan view of the parts as seen in Fig. 1; Fig. 4 is a longitudinal section taken on the plane 4—4 of Fig. 3; Fig. 5 is a detail vertical longitudinal section taken on the line 5—5 of Fig. 3; Fig. 6 is a detail vertical transverse section as seen on the plane of the line 6—6 of Fig. 3; Fig. 7 is a perspective view of the attaching plate; and Fig. 8 is a plan view of one of the connecting plates of a cutting blade to be described.

In the accompanying drawings, a portion of a cultivator standard S is shown to which a substantially upright attaching plate 1 is secured by means of bolts 2 or by other means, said bolts being here shown as passed through an attaching shank 3 which rises from a spade shaped plow point 4. Projecting laterally from and formed integrally with the lower end of the plate 1, is a pair of horizontal attaching ears 5; which diverge rearwardly from the plate 1, and which are provided with openings 6, as most clearly seen in Fig. 7.

Resting upon the ears 5, are the forward ends of crossed adjusting links 7, whose rear ends are provided with longitudinal slots 8. The forward ends of said links 7, are pivoted to the ears 5 by passing the shanks 9, of the eye bolts, upwardly through the opening 6 and through similar openings in the front ends of the links 7, and by providing washers 10 and nuts 11 in the upper ends of said shanks. It will be noted that the eyes 12 of the eye bolts, contact with the under side of the ears.

Underlying the rear slotted ends of the links 7 are U-shaped clamp members 13, whose cross bars contact with said links and are provided with openings through which shanks 14, of eye bolts, rise, said shanks receiving washers 15 and clamping nuts 16, upon their upper ends and carrying the eyes 17 upon their lower ends. By reference more particularly to Fig. 5, it will be seen that the openings in the eyes 17 aline with openings 18 formed in the arms of the clamp members 13. This construction become advantageous in a manner to be described.

Designed to be used in connection with the structure before described, is one or more supplemental harrows (see more particularly Figs. 2 and 5), each of said harrows comprising a bar or plate 19 which is provided with threaded extensions 20 on its opposite ends, and with a plurality of depending harrow teeth 21 which may be secured to the bar 19 in the manner shown in the drawings, or by any appropriate means. When a harrow attachment or attachments, as the case may be, are to be applied to the structure above described, the nuts 16 are loosened to an extent sufficient to allow the shanks 14 to move freely within the slots 8, whereupon the extensions 20 may be inserted through the eyes 12 and through the alined openings in the eyes 17, and in the clamping members 13, after which clamping nuts 22 and washers, if desired, may be positioned in said extensions 20, thereby securing the harrow attachments in rigid relation to the remainder of the device. Before tightening the nuts 22, however, the nuts 16 are usually tightened, thereby moving the eyes 17 upwardly to bind the rear-most extensions 20 within the clamp members 13, thereby preventing the bars 19 from rotating until said nuts 22 are tightened.

By an inspection of the drawings (more particularly Fig. 3), it will be seen that loosening of the nuts 16 will allow the links 7 to be swung inwardly or outwardly, thereby moving the implements carried by the device to an extent great enough to allow wider or narrower strips of earth to be worked.

Likewise designed for use in connection with the main frame structure, is one or more longitudinal cutting blades 25, which are attached to slotted plates 26 by passing suitable bolts 27 through said blades and through the slots in the plates. Rising from the plates 26 are attaching lugs or ears 28, which are provided with threaded extensions 20' which correspond to the extensions 20 before described, said extensions 20' being designed for the same use as said extensions 20.

From the foregoing, it will be seen that loosening of the clamping nuts 16 will allow the implements carried by the main frame structure, to be adjusted laterally, or turning said implements to cause their extensions 20 or 20' as the case may be, to rotate within the supports for said extension, will give further adjustment.

For weeding, a pair of blades 25 and the point 4 are preferably employed, while for working soil in other manners, the two harrow attachments may be provided, with or without the point 4, or one harrow attachment and one blade may be employed with or without said point. This last named combination of parts, however, is very seldom used, but is illustrated, primarily for the purpose of disclosing both forms of the attachments in a single set of drawings. The device becomes extremely advantageous for loosening the soil on the opposite sides of rows of unsprouted seed, for which purpose, the two sets of harrow teeth, without the point 4 are employed. These teeth may likewise be employed for the same purpose, when the seed has risen above the ground, or the blades 25 may then be employed for the purpose of cutting weeds on the opposite sides of the rows.

The device, as above described, may be put to a vast number of uses, too numerous to be herein set forth, and it is thought that the above explanation and description will be ample.

I claim:

1. A device of the character described, comprising an upright attaching plate having laterally projecting ears on its lower end, rearwardly extending implements pivotally united at their forward ends to said ears, and crossed adjusting links likewise pivoted to said ears and having their rear ends adjustably secured to the rear ends of said implements.

2. A device of the character described, comprising a substantially upright attaching plate having laterally projecting ears on its lower end, rearwardly extending implements pivotally connected to said ears, and crossed adjusting links pivotally connected with said ears upon the pivots of said implements, the rear ends of said links being adjustably connected to the rear ends of said implements.

3. A device of the character described, comprising a substantially upright attaching plate having laterally projecting ears on its lower end, a pair of rearwardly extending implements, having their forward ends underlying said ears, a pair of crossed links having their forward ends overlying said ears, pivot bolts rising from said implements through the ears and the free ends of said links, nuts on the ends of said bolts and adjusting connections between the rear ends of said links and the rear ends of the implements.

4. A device of the character described, comprising a substantially upright attaching plate having a pair of laterally projecting ears on its lower end, a pair of rearwardly diverging implements having their forward ends underlying said ears, a pair of crossed adjusting links having their forward ends overlying said ears, pivot bolts rising from the front ends of the implements through the ears and through the front ends of said links, the rear ends of the latter being slotted longitudinally, other bolts rising from the rear ends of the implements through the slots in said links, and nuts on said bolts whereby to secure said links against movement.

5. A device of the character described, comprising a substantially upright attaching plate having laterally projecting ears on its lower end, an earth working tool carried by said plate and projecting in advance thereof, rearwardly diverging implements pivoted to said ears, and means whereby said implements may be adjusted around their pivots.

6. A device of the character described, comprising an upright attaching plate having a pair of laterally projecting ears on its lower end, crossed links overlying said ears and having their rear ends slotted, eye bolts rising through said ears and through the forward ends of said links, nuts on said eye bolts, other eye bolts rising through the rear ends of said links, other nuts on the last named eye bolts, implements interposed between the front and rear eye bolts, and having threaded extensions projecting therethrough, and nuts on said extensions.

7. A device of the character described, comprising a substantially upright attaching plate having a pair of laterally projecting ears on its lower end, crossed adjusting links having their forward ends overlying said ears, eye bolts rising through the ears and through the forward ends of said links, the rear ends of the latter being longitudinally slotted, U-shaped clamping members having their cross bars contacting with the under side of said links, said members having openings alining with the slots in the links, eye bolts having their eyes located between the arms of the U-shaped members, their shanks rising through said openings and slots, clamping nuts on the upper ends of said shanks earth working implements interposed between the first mentioned eye bolts and said clamping members, and threaded extensions on said implements, the extensions on the forward ends thereof projecting through said first named eye bolts, and the extensions on the rear ends of said implements projecting through the arms of the U-shaped clamping members, and through the eyes interposed therebetween.

8. In a device of the character described, a pair of implements pivoted at their forward ends to swing laterally in a horizontal plane, and to have their lower portions swung upwardly, a pair of adjusting links having their forward ends pivoted, their rear ends being slotted, U-shaped clamping members beneath said slotted ends and having openings registering with the slots therein, eye bolts having their eyes interposed betwen the arms of said U-shaped members, their shanks rising through said openings and said slots, clamping nuts on the upper ends of said shanks, and extensions on the rear ends of the implements and projecting through the two arms of the U-shaped members and through the intervening eyes.

In testimony whereof I have hereunto set my hand in presence of two subscribing witnesses.

CARL BERGSTROM.

Witnesses:
A. G. SECHRIST,
D. E. ANDREWS.

Copies of this patent may be obtained for five cents each, by addressing the "Commissioner of Patents, Washington, D. C."